Patented Dec. 4, 1934

1,983,041

UNITED STATES PATENT OFFICE 1,983,041

PRODUCTION OF CARBAMATES OF THE ALKALI-FORMING METALS

Robert Burns MacMullin and Wesley King McCready, Niagara Falls, N. Y., assignors to The Mathieson Alkali Works, Inc., New York, N. Y., a corporation of Virginia No Drawing. Application June 4, 1932, Serial No. 615,464

6 Claims. (Cl. 260—112)

This invention relates to improvements in the production of carbamates of the alkali metals and the alkaline earth metals. One conventional method of producing these carbamates is to precipitate the carbamate from a liquid ammonia solution of a soluble salt of the metal by the introduction of carbon dioxide under appropriate conditions. The carbamates of the alkali metals and the alkaline earth metals are very soluble in water and, as a consequence, the absence of water has been regarded as important to efficient recovery of these carbamates. On the other hand, the available salts of the alkali metals and the alkaline earth metals are in general more soluble in ammonia in the presence of water than in anhydrous ammonia. This invention provides modifications of this conventional method which, instead of being hampered by, take advantage of these facts and which afford several important advantages.

The first modification of this invention comprises the addition of water to the usual reactants, ammonia, carbon dioxide and a soluble salt of the metal of the carbamate to be produced. The second modification comprises, in conjunction with the first, the addition of a liquid miscible with water but in which the carbamate to be produced is less soluble than in water to the usual reactants. The first modification operates, in general, to increase the solubility of the salt of the metal of the carbamate to be produced in the reaction mixture, and also to reduce the vapor pressure of the reaction mixture, and the second modification operates to decrease the solubility of the metal carbamate in the reaction mixture.

In carrying out the invention to embody the first modification, carbon dioxide and a soluble salt of the metal of the carbamate to be produced are brought together in the presence of water and ammonia, and the metal carbamate is separated from the resulting solution. In the production of sodium carbamate, for example, a solution of ammonia in water, containing about 50% by weight of each, is saturated with sodium chloride and this solution is carbonated at about 20° C. under superatmospheric pressure. Sodium carbamate, $NaCO_2NH_2$, is precipitated, the ammonium chloride formed in the reaction dissolving in the aqueous ammonia solution. The precipitated sodium carbamate is separated from the aqueous ammonia solution, by filtration for example. This separated sodium carbamate may be contaminated with some ammonium carbamate, by the introduction of an excess of carbon dioxide for example. Such contaminating ammonium carbamate is easily separated from the product, by volatilization in a current of dry air for example. The ammonium chloride dissolved in the aqueous ammonia solution can be recovered by evaporation. Other salts useful for the production of sodium carbamate include sodium bromide, sodium iodide and sodium nitrate. The carbamates of potassium and lithium and of calcium, barium and magnesium can similarly be produced from the bromides, chlorides, iodides and nitrates of these metals. The water present during the reaction may, with advantage, range from about 5% to about 100% by weight of the ammonia.

In carrying out the invention to embody both modifications, carbon dioxide and a soluble salt of the metal to be produced are brought together in the presence of water, a liquid miscible in water but in which the carbamate to be produced is less soluble than in water, and ammonia, and the metal carbamate is separated from the resulting solution. Ethyl alcohol, methyl alcohol and acetone are particularly useful as diluents of the aqueous ammonia solution in which the reaction is effected. Such diluents may be added in proportions ranging from about 50% to about 200% by weight of the water. The sequence in which the reactants are brought together is not important. For example, the metal salt may be dissolved in the aqueous alcohol solution, the ammonia added to this solution and the resulting solution carbonated, or the metal salt may be dissolved in the aqueous alcohol solution and the ammonia and carbon dioxide then added together as such or in the form of a compound such as ammonium carbamate, or the metal salt may be dissolved in water, the ammonia and carbon dioxide added to this solution and the alcohol then added to the resulting solution.

The following examples will illustrate the invention:

Example 1

4 parts (by weight) of sodium chloride are added to a mixture of 54 parts of ammonia and 6 parts of water, and carbon dioxide is then passed into the mixture until 3 parts have been absorbed. The reaction mixture is brought to a temperature of about 20° C. and the crystalline sodium carbamate formed is separated by filtration. A yield of about 5.7 parts of pure sodium carbamate is obtained.

Example 2

11 parts of sodium chloride are added to a mixture of 52 parts of ammonia and 22 parts of water, and carbon dioxide is then passed into the mixture until 8.2 parts have been absorbed. The reaction mixture is brought to a temperature of about 20° C. and the crystalline sodium carbamate formed is separated by filtration. A yield of about 14 parts of pure sodium carbamate is obtained.

*Example 3*

10 parts of sodium chloride are stirred into a mixture of 24 parts of ammonia, 11 parts of carbon dioxide, 40 parts of water and 50 parts of ethyl alcohol while maintaining the reaction mixture at a temperature of about 30° C. The crystalline sodium carbamate formed is separated by filtration. A yield upwards of about 10 parts of pure sodium carbamate is obtained.

In carrying out the invention to embody the second modification, a double salt, sodium ammonium carbonate, will form either with or to the exclusion of the metal carbamate, if either the diluent concentration or the temperature is too low. With ethyl alcohol as the diluent, for example, it is advantageous to bring the reactants together at a temperature above about 20° C. and to have the ethyl alcohol present in proportion approximating 100–200% by weight on the water.

In conjunction, the two modifications of the invention make possible the production of a product of particularly desirable crystalline form, the crystals being usually much larger than those produced by precipitation from anhydrous liquid ammonia in the conventional manner. Using but the first modification of the invention, a substantial excess of ammonia is usually desirable to stabilize the metal carbamate while in contact with the water; this requirement is eliminated or reduced by the second modification of the invention. In general, it is desirable to use at least a slight excess of both ammonia and carbon dioxide and to have the ratio of ammonia to carbon dioxide at least 2:1.

The chloride of the metal of the carbamate to be produced is a particularly desirable raw material since by the use of the chloride the process of the invention becomes a process for the production of ammonium chloride as well as for the production of the metal carbamate.

We claim:

1. In the production of carbamates of the alkali forming metals, the improvement which comprises bringing together, in the presence of water, a diluent liquid miscible with water but in which the carbamate to be produced is less soluble than in water, and ammonia, carbon dioxide and a soluble salt of the metal, water being present in proportion approximating 5%–100% by weight of the ammonia, and separating the metal carbamate from the resulting solution.

2. In the production of carbamates of the alkali forming metals, the improvement which comprises bringing together, in the presence of water, methyl alcohol and ammonia, carbon dioxide and a soluble salt of the metal, and separating the metal carbamate from the resulting solution.

3. In the production of carbamates of the alkali forming metals, the improvement which comprises bringing together, in the presence of water, ethyl alcohol and ammonia, carbon dioxide and a soluble salt of the metal, and separating the metal carbamate from the resulting solution.

4. In the production of carbamates of the alkali forming metals, the improvement which comprises bringing together, in the presence of water, acetone and ammonia, carbon dioxide and a soluble salt of the metal, and separating the metal carbamate from the resulting solution.

5. In the production of carbamates of the alkali forming metals, the improvement which comprises bringing together, in the presence of water, ethyl alcohol and ammonia, carbon dioxide and a soluble salt of the metal, at a temperature above about 20° C., ethyl alcohol being present in proportion approximating 100–200% by weight on the water, and separating the metal carbamate from the resulting solution.

6. In the production of carbamates of the alkali forming metals, the improvement which comprises bringing together, in the presence of water, a diluent liquid miscible with water but in which the carbamate to be produced is less soluble than in water, and ammonia, carbon dioxide and a chloride of the metal, water being present in proportion approximating 5%–100% by weight of the ammonia, and separating the metal carbamate from the resulting solution.

ROBERT BURNS MacMULLIN.
WESLEY KING McCREADY.